UNITED STATES PATENT OFFICE.

JULIUS R. POND, OF NEW HARTFORD, CONNECTICUT.

IMPROVEMENT IN CONDENSING MILK.

Specification forming part of Letters Patent No. 50,950, dated November 14, 1865.

*To all whom it may concern:*

Be it known that I, JULIUS R. POND, of New Hartford, in the county of Litchfield and State of Connecticut, have invented a certain new and useful Improvement in the Processes now generally practiced for Condensing Milk; and I do hereby declare that the following is a full, clear, and exact description thereof.

No drawings accompany this specification, for the reason that my improved process may be performed in any of the different kinds of apparatus at present in use in milk-condensing establishments.

It is well known that in the practical condensing of milk serious evils arise from the tendency of the albuminous constituents in the crude milk to coat the interior surface of the pan or vessel in which the condensing is carried on. This coating takes place in practice to a very injurious extent, and will interfere with the success of the condensing process unless proper measures are adopted to prevent it. One method which is resorted to for this purpose is to scald or heat the crude milk preparatory to running it into the condensing-vessel; but this scalding is liable to impart to the milk a burned and unpleasant taste, and my present improvement is designed to prevent this result, while at the same time it fully secures against the coating of the condensing-vessel by the albumen of the crude milk.

I have already obtained one patent in the United States, bearing date on the 5th day of January, 1864, for a process designed for the same general purpose as the improvement herein to be described. That process I have found to be entirely successful; and it consists in covering the interior surface of the condensing-vessel with the oleine of butter, or of other suitable article, before the milk to be condensed is run into it. But at the time of my making that invention I also discovered that if the oleine be used as directed in said patent for a certain length of time—say, for six months, or sometimes shorter or longer—it would result that the interior surface of the condensing-vessel would be put into such a condition that thereafter it would not be necessary to use more oleine for a considerable period of time. This effect is probably due to the formation of a thin film or coat of the greasy elements of the oleine upon the interior surface of the condensing-vessel of a character sufficiently permanent to render further applications of the oleine unnecessary, or less necessary, for a longer or shorter period.

In the ordinary treatment of milk-condensing vessels with oleine in accordance with my above-mentioned patent it is usual to apply the oleine to the vessel every day; but although, as already stated, the employment of oleine entirely prevents the burned or scalded taste in the milk, of which I have spoken, yet in using it it is impossible to keep it from giving a slight oily flavor to the product, and for this reason it is desirable to apply it as seldom as possible, so long as the prevention of the burned taste is secured. In view of this, therefore, my present invention consists in employing oleine for the purpose of producing such a condition of the interior surface of the vessel used for condensing milk, whether the milk has been heated or not before running it into such vessel, that daily applications of oleine to the vessel after such condition is obtained are not required, whereby the burned or scalded taste liable to be produced in condensed milk by a preliminary coagulation by heat of the albuminous particles of the crude material is entirely obviated, while no oily flavor which is at all injurious is imparted to the product. The oleine is to be employed for this purpose precisely in the same manner as under my patent already referred to—that is say, by applying it to the interior surface of the condensing-vessel by means of cloth, sponge, or in any other convenient mode which will serve to thinly coat the surface of the vessel with it; but by my present improvement the daily applications of it may be discontinued after the condition of which I have spoken has been produced upon the interior surface of the condensing-vessel and until a further application is found necessary—the time for which will be readily ascertained in practice.

I do not limit myself to the use of the oleine of any particular article or class of articles, but design to claim the employment of the oleine of any article which will answer the above-described purpose, and also claim any other substance than oleine which will answer such purpose.

Having thus described my invention, I do not claim, broadly, in this patent the use of oleine for coating the interior surface of vessels for condensing milk; but

What I claim and desire to secure by Letters Patent, is—

Employing oleine or its equivalent for the purpose of putting the interior surface of a vessel used for condensing milk, whether the milk is or is not heated preparatory to running it into such vessel, into the condition above described, so that after such condition is attained daily applications of oleine are not required, substantially as and for the purposes set forth.

JULIUS R. POND.

Witnesses.
  S. D. COZZENS,
  J. W. BULTER.